United States Patent
Lindholm et al.

(10) Patent No.: US 9,900,806 B2
(45) Date of Patent: *Feb. 20, 2018

(54) HANDLING CALL TRANSFER IN A COMMUNICATION NETWORK

(71) Applicant: Telefonaktiebolaget L M Ericsson (publ), Stockholm (SE)

(72) Inventors: Fredrik Lindholm, Stockholm (SE); Ralf Keller, Würselen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 11 days.

This patent is subject to a terminal disclaimer.

(21) Appl. No.: 14/919,390

(22) Filed: Oct. 21, 2015

(65) Prior Publication Data

US 2016/0044547 A1 Feb. 11, 2016

Related U.S. Application Data

(63) Continuation of application No. 14/151,572, filed on Jan. 9, 2014, now Pat. No. 9,173,145, which is a
(Continued)

(51) Int. Cl.
*H04W 4/00* (2009.01)
*H04W 36/00* (2009.01)
(Continued)

(52) U.S. Cl.
CPC ......... *H04W 36/0022* (2013.01); *H04W 4/14* (2013.01); *H04W 36/14* (2013.01); *H04W 88/06* (2013.01)

(58) Field of Classification Search
CPC ... H04W 36/0022; H04W 4/14; H04W 36/14; H04W 88/06
(Continued)

(56) References Cited

U.S. PATENT DOCUMENTS

| 2009/0238143 A1 | 9/2009 | Mukherjee et al. |
| 2010/0296484 A1 | 11/2010 | Wu |
| 2012/0115489 A1 | 5/2012 | Shuai et al. |

FOREIGN PATENT DOCUMENTS

| CN | 101480083 A | 7/2009 |
| CN | 201499311 U | 6/2010 |

(Continued)

OTHER PUBLICATIONS

3GPP TR 23.885 v1.2.0, Mar. 17, 2011 (from Applicant's IDS filed on Oct. 21, 2015, hereafter referred as 3GPP.).*

(Continued)

*Primary Examiner* — Mang Yeung (74) *Attorney, Agent, or Firm* — Sage Patent Group (57) ABSTRACT

A method and apparatus for handling a call transfer from a circuit switched access network to a packet switched access network. A Mobile Switching Centre Server receives a notification that a call for a terminal requires handover from a circuit switched access network to a packet switched access network. The MSC Server determines whether the terminal is currently registered in an IMS network and/or whether the MSC Server is registered such that it can perform handover from the circuit switched access network to the packet switched access network. If so, then return Single Radio Voice Call Continuity is invoked to perform a handover of the call from the circuit switched access network to the packet switched access network. If not then the MSC Server invokes error handling procedures.

11 Claims, 6 Drawing Sheets

Related U.S. Application Data continuation of application No. 13/496,981, filed as application No. PCT/EP2012/052105 on Feb. 8, 2012, now Pat. No. 8,660,091.

(60) Provisional application No. 61/470,146, filed on Mar. 31, 2011.

(51) Int. Cl.
*H04W 36/14* (2009.01)
*H04W 4/14* (2009.01)
*H04W 88/06* (2009.01)

(58) Field of Classification Search
USPC .................................. 370/331; 455/436–444
See application file for complete search history.

(56) References Cited

FOREIGN PATENT DOCUMENTS

| CN | 101959269 A | 1/2011 | |
|---|---|---|---|
| CN | 101971669 A | 2/2011 | |
| EP | 2 146 533 A2 | 1/2010 | |
| EP | 2146533 A2 * | 1/2010 | ............ H04W 12/06 |
| RU | 2366107 C2 | 8/2009 | |
| WO | WO 2008/002997 A2 | 1/2008 | |
| WO | WO 2009/088331 A1 | 7/2009 | |

OTHER PUBLICATIONS

International Search Report, PCT Application No. PCT/EP2012/052105, dated Mar. 16, 2012, 5 pp.
Written Opinion of the International Searching Authority, PCT Application No. PCT/EP2012/052105, dated Mar. 16, 2012, 11 pp.
Ericsson et al., S2-113474 "rSRVCC IMS PS registration expiration", 3GPP Draft; S2-113474$_1$ $_{WAS}$_S2-113026_RSRVCC_IMS_REG_EXPIRATION, $3^{rd}$ Generation Partnership Project, XP05048775; vol. SA WG2, no. Naantali, Finland Jul. 2011; pp. 1-2.
Ericsson: S2-070158 "Proposed Conclusion for Issue on Impact of non-call related signalling", 3GPP Draft; S2-070158_Conclusion Non-Call REL Signalling, $3^{rd}$ Generation Partnership Project, XP050258962; vol. SA WG2, no. Florence, Italy Jan. 2007; p. 3.
3GPP TR 23.885 "$3^{rd}$ Generation Partnership Project; Technical Specification Group Services and System Aspects; Feasibility Study of Single Radio Voice Call Continuity (SRVCC) from UTRAN/GERAN to E-UTRAN/HSPA; Stage 2 (Release 10)", 3GPP TR 23.885, XP050476308; no. V1.2.0, Mar. 2011; pp. 1-74.
3GPP, Technical Specification, "3rd Generation Partnership Project; Technical Specification Group Services and System Aspects; General Packet Radio Service (GPRS); Service description; Stage 2 (Release 9)", 3GPP TS 23.060 V9.8.0 (Mar. 2011), 301 pp.
3GPP, Technical Specification, "3rd Generation Partnership Project; Technical Specification Group Services and System Aspects; Single Radio Voice Call Continuity (SRVCC); Stage 2 (Release 11)", 3GPP TS 23.216 V11.0.0 (Mar. 2011), 50 pp.
3GPP, Technical Specification, "3rd Generation Partnership Project; Technical Specification Group Services and System Aspects; IP Multimedia Subsystem (IMS); Stage 2 (Release 10)", 3GPP TS 23.228 V10.4.0 (Mar. 2011), 272 pp.
3GPP, Technical Specification, "3rd Generation Partnership Project; Technical Specification Group Services and System Aspects; IP Multimedia Subsystem (IMS) Service Continuity; Stage 2 (Release 10)", 3GPP TS 23.237 V10.5.0 (Mar. 2011), 154 pp.
3GPP, Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.3.0 (Mar. 2011), 278 pp.
3GPP, Technical Specification, "3rd Generation Partnership Project; Technical Specification Group Core Network and Terminals; Mobile radio interface Layer 3 specification; Core network protocols; Stage 3 (Release 9)", 3GPP TS 24.008 V9.6.0 (Mar. 2011), 614 pp.
First Office Action and English language translation, Chinese Application No. 201280016338.5, dated May 27, 2016.
Russian Decision on Grant Corresponding to Russian Application No. 2013148579; 7 Pages, (2016).
Extended European Search Report for European Patent Application No. 17172409.9 dated Jul. 7, 2017.

* cited by examiner

HANDLING CALL TRANSFER IN A COMMUNICATION NETWORK

CROSS REFERENCE TO RELATED APPLICATIONS

This application is a continuation of U.S. patent application Ser. No. 14/151,572, filed Jan. 9, 2014, which itself is a continuation of U.S. patent application Ser. No. 13/496,981, filed Mar. 19, 2012, now U.S. Pat. No. 8,660,091 which itself is a 35 U.S.C. § 371 national stage application of PCT International Application No. PCT/EP2012/052105, filed on Feb. 8, 2012, which itself claims priority to U.S. Provisional Application No. 61/470,146, filed Mar. 31, 2011, the disclosure and content of all of which are incorporated herein by reference in their entirety as if set forth fully herein.

TECHNICAL FIELD

The present invention relates to the field of handling call transfer in a communication network, and in particular to handling a handover of a call from a circuit switched to a packet switched network.

BACKGROUND

Long Term Evolution (LTE) is a communication network technology currently under development by the 3rd Generation Partnership Project (3GPP). LTE requires a new radio access technique termed Evolved Universal Terrestrial Radio Access Network (E-UTRAN), which is designed to improve network capacity, reduce latency in the network, and consequently improve the end-user's experience. System Architecture Evolution (SAE) is the core network architecture for LTE communication networks.

LTE uses exclusively packet switched (PS) signalling. When a network operator wishes to introduce LTE, he will be unable to operate a complete LTE service from the first day. LTE will need to be rolled out gradually to replace existing technologies. In order to do this, LTE networks must have some way of interacting with networks that use other technology, such as circuit switched (CS) signalling. Single Radio Voice Call Continuity (SRVCC), described in 3GPP TS 23.237 and 3GPP TS 23.216, allows handover of a session from an LTE network to a CS network. A similar study (known as rSRVCC, or SRVCC return direction) is looking into transferring a call from CS to PS, and is described in TR 23.885v1.2.0.

While the description herein refers to a PS network as an LTE network, it will be appreciated that the description applies equally to other types of PS network.

Figure 1:
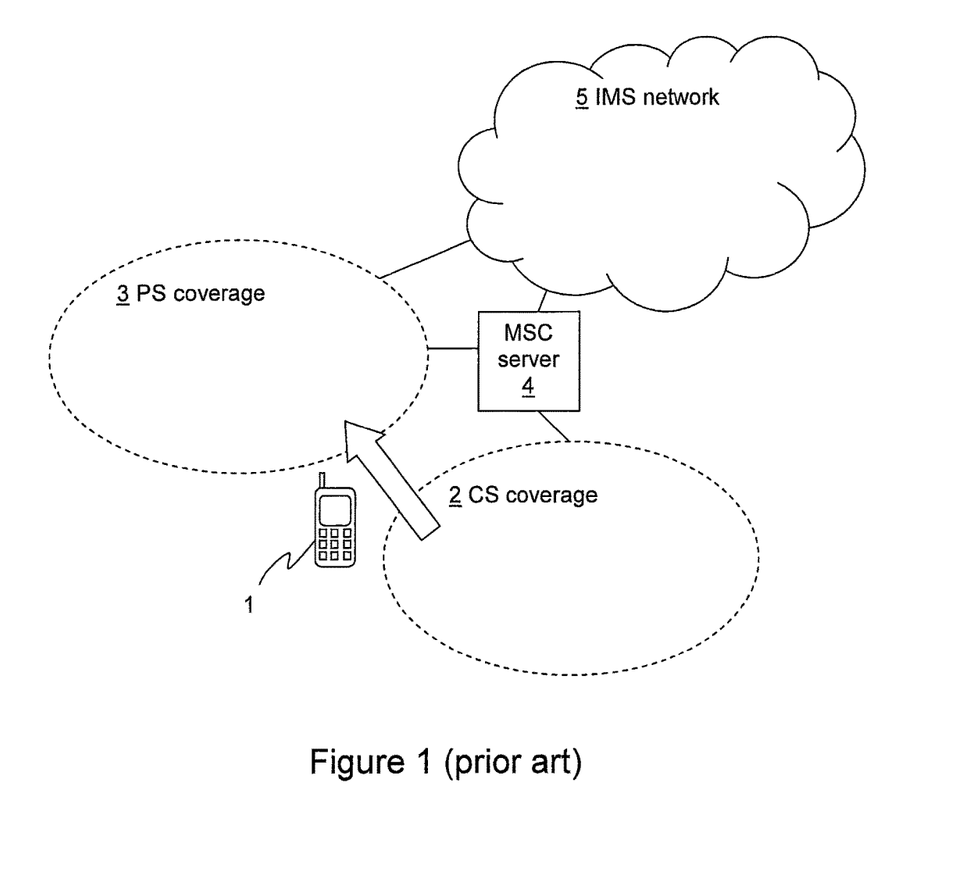
FIG. 1 illustrates schematically in a block diagram a handover from a CS to a PS network.

Referring to FIG. 1, there is illustrated a scenario in which a User Equipment (UE) 1 is in a location 2 that has legacy CS coverage, and then moves to a location 3 that has PS coverage such as an LTE network 3.

Figure 2:
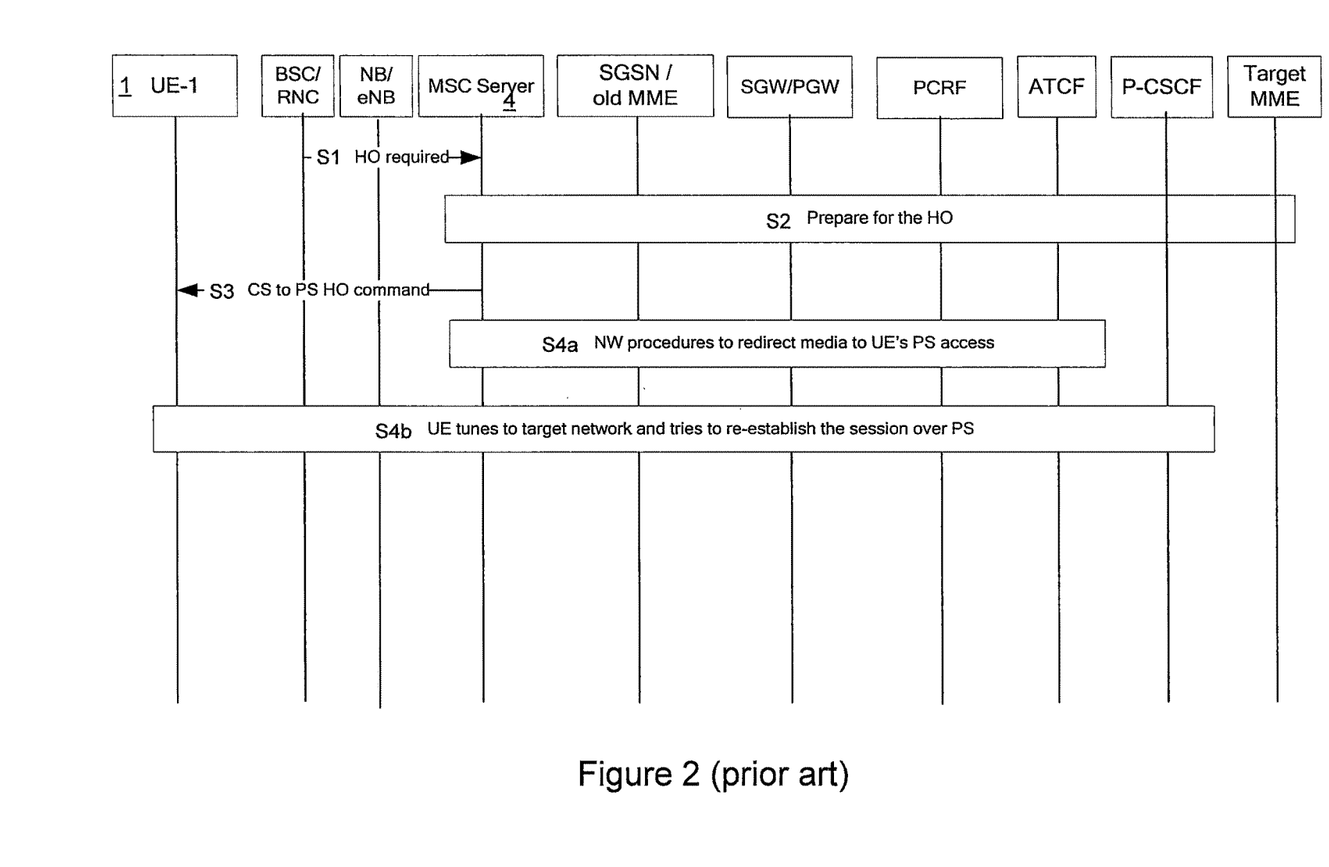
FIG. 2 is a signalling diagram illustrating procedures during handover from a CS to a PS network.

Referring to FIG. 2, there is illustrated a signalling procedure that shows how such a handover may be performed. The following numbering corresponds to that for FIG. 2:

S1: The radio network 2 in which the UE 1 is located detects that a handover may be possible/required and notifies the Mobile Switching Centre (MSC) Server 4 that is enhanced for rSRVCC.

S2. The MSC server 4 initiates a preparation procedure for the handover, which usually involves reservation of resources in the target network to make sure that the transfer can complete successfully.

S3. Once this has been done, the MSC Server 4 notifies the UE 1 about that a handover to the PS network 3 is to take place.

S4. The handover takes place. In step S4a, the network starts to send media towards the UE 1 over the PS access network 3 instead of over the CS access network 2. In step S4b, the UE 1 tunes in to the PS target network 3 and tries to re-establish the communication session control over PS (by sending an INVITE towards the network 5). The media can now be sent and received over the PS access 3.

One of the assumptions and prerequisites for rSRVCC is that the UE 1 has an active IP Multimedia Subsystem (IMS) registration when the transfer from CS to PS is performed. In practice, it may be difficult for the UE 1 to maintain the registration during a call, for example if the UE 1 starts the call in a CS access network 2 where the PS access network 3 can not be used at the same time as the CS access network 2. This is a particular problem for GSM EDGE Radio Access Network (GERAN) where DTM (Dual Transfer Mode) is not supported.

TR 23.885v1.2.0 (clause 6.3), proposes to handle this case by attempting to maintain the registration for the UE 1 over the PS access network 3. However, this is complex and may be costly.

SUMMARY

It is an object of the invention to provide a way for handing over a call from a CS to a PS access network without having to maintain a registration for a UE over a PS access network when a CS access network is being used.

According to a first aspect of the invention, there is provided a method of handling a call transfer from a circuit switched access network to a packet switched access network. A Mobile Switching Centre, MSC, Server receives a notification that a call for a terminal requires handover from a circuit switched access network to a packet switched access network. The MSC Server determines whether the terminal is currently registered in an IMS network and/or whether the MSC Server is registered such that it can perform handover from the circuit switched access network to the packet switched access network. If so, then return Single Radio Voice Call Continuity is invoked to perform a handover of the call from the circuit switched access network to the packet switched access network. If not then the MSC Server invokes error handling procedures.

In a particular embodiment, the error handling procedure comprises cancelling the handover. In this case, the method optionally further comprises sending a notification message to the terminal. The notification may include a notification that handover has failed and/or a notification that the terminal is not registered in the IMS network.

In an alternative embodiment, the error handling procedure comprises invoking handover from the circuit switched network to a different circuit switched network instead of the packet switched network using procedures other than those of return Single Radio Voice Call Continuity.

In a particular embodiment, the method comprises, prior to receiving the notification that the call for the terminal requires handover, sending a subscription request message from the MSC Server to a further node. The subscription request message requests a notification of a change in a registration status of the terminal. In this way, the MSC Server remains aware of the current registration status of the terminal, and whether or not it is currently registered in the IMS network.

The further node is optionally selected from any of an Access Transfer Control Function, a Serving-Call Session Control Function and a Service Centralization and Continuity Application Server.

Where a subscription request has been sent, the method may comprise, at the MSC Server, receiving from the further node a notification, the notification informing the MSC Server of a change in registration status of the terminal.

In a particular embodiment, the MSC Server determines that it is not registered so as to be able to perform handover from the circuit switched access network to the packet switched access network by determining that it does not have the address of an Access Transfer Control Function.

According to a second aspect, there is provided a MSC Server comprising a first receiver for receiving a notification that a call for a terminal requires handover from a circuit switched access network to a packet switched access network. A processor is provided for determining whether the terminal is currently registered in an IMS network and/or whether the MSC Server is registered such that it can perform handover from the circuit switched access network to the packet switched access network. The processor is further arranged to, in the event that the terminal is not currently registered in the IMS network and/or the MSC Server is not registered so as to be able to perform handover from the circuit switched access network to the packet switched access network, invoke an error handling procedure in the MSC Server. In the event that the terminal is currently registered in the IMS network and MSC Server is registered so as to be able to perform handover from the circuit switched access network to the packet switched access network, the processor is arranged to invoke return Single Radio Voice Call Continuity to perform a handover of the call from the circuit switched access network to the packet switched access network.

According to particular embodiments, the error handling procedure comprises cancelling the handover. In this case, in a further optional embodiment, the MSC Server further comprises a transmitter for sending a notification message to the terminal. The notification message includes any of a notification that handover has failed and a notification that the terminal is not registered in the IMS network.

In an alternative embodiment, the error handling procedure comprises invoking handover from the circuit switched network to a different circuit switched network using procedures other than those of return Single Radio Voice Call Continuity.

According to particular embodiments, the MSC Server is provided with a second transmitter for sending a subscription request message to a further node, the subscription request message requesting a notification of a change in a registration status of the terminal. A second receiver is also provided for receiving from the further node a notification, the notification informing the MSC Server of a change in registration status of the terminal.

The processor may be arranged to determine that the MSC Server is not registered so as to be able to perform handover from the circuit switched access network to the packet switched access network by determining that that it does not have the address of an Access Transfer Control Function.

According to a third aspect, there is provided a computer program comprising computer readable code which, when run on an MSC Server, causes the MSC Server to perform the method as described above in the first aspect.

According to a fourth aspect, there is provided a computer program product comprising a computer readable medium and a computer program as described above in the third aspect, wherein the computer program is stored on the computer readable medium.

According to a fifth aspect, there is provided a terminal having a receiver. If the terminal is not currently registered in an IMS network and/or an MSC Server serving the terminal is not registered so as to be able to perform handover from a circuit switched access network to a packet switched access network, as described above in the first aspect of the invention, the receiver receives a message from the MSC that may include a notification that handover has failed or a notification that the terminal is not registered in the IMS network.

DETAILED DESCRIPTION

As described above, an assumption of rSRVCC is that the terminal (for example, a UE 1) has an active IMS registration when the transfer from CS to PS is performed, but in practice, it may be difficult for the UE 1 to maintain the registration during a call.

It has been realised that the average call length is about 2 minutes, and so a likelihood that an IMS registration for the UE 1 over the PS access network 2 will expire during the call prior to an rSRVCC transfer is very small. Hence, it may be appropriate to have a proper error handling for this case, instead of maintaining a registration. However, no such procedures are defined. Under current procedures, if a handover is required then the MSC Server 4 starts the rSRVCC and reserves potential resources. However, once the network has been setup and the CS to PS handover Command is sent to the UE 1, the UE 1 will realize that the IMS registration has expired and so the UE 1 cannot re-establish the call over the PS network 3 as it has not maintained its registration in the PS network. As a result, the call will be dropped.

In order to address this, the MSC Server 4 provides error handling procedures for cancelling the rSRVCC handover command in the event that the UE's IMS registration over the PS access network 3 is no longer active, or the MSC Server's 4 IMS registration has not been anchored for rSRVCC.

The MSC Server 4 becomes aware of the UE's 1 IMS PS registration status by subscribing to the registration status of the UE's IMS registration, and if the UE's IMS registration is deregistered/timed out, receives a notification about this. If the UE 1 is registering again after being de-registered, the MSC Server 4 receives an updated notification about the status of the UE's 1 registration.

Figure 3:
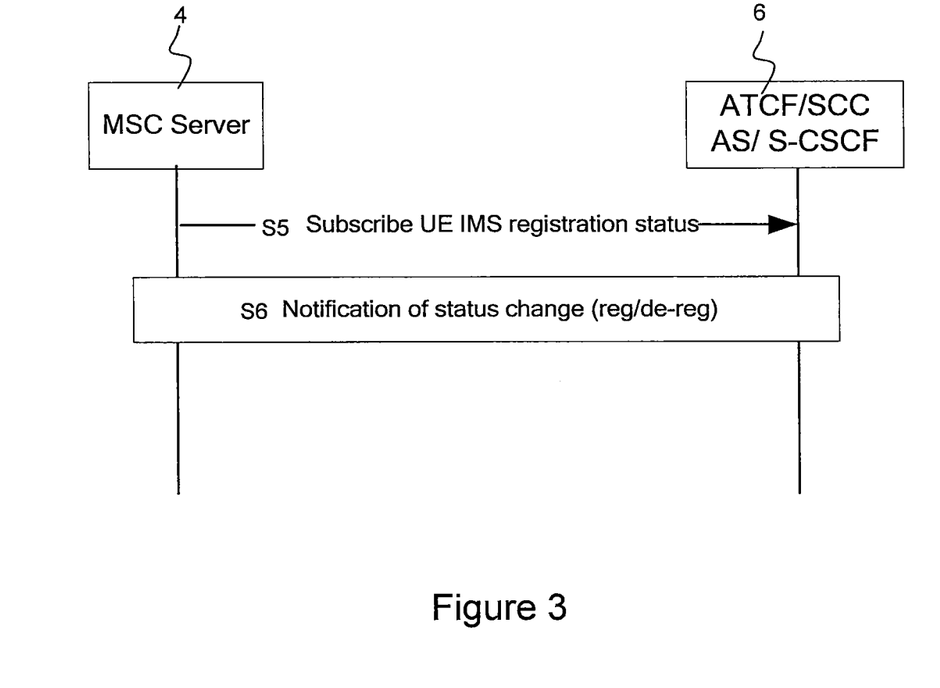
FIG. 3 is a signalling diagram illustrating procedures for subscribing to registration information according to an embodiment of the invention.

Turning to FIG. 3, there is illustrated the initial case where the MSC Server 4 subscribes S5 to the registration status of the UE 1. A so called SUBSCRIBE/NOTIFY may be used as an example to receive the registration status of the UE.

A subscription message may be sent to one of the three nodes:

Access Transfer Control Function (ATCF). This function is located in the serving network, as the MSC Server 4, and by subscribing to registration status in the ATCF gives a short communication path to receive a notify (and the home network would not need to be consulted).

S-CSCF. The S-CSCF has the benefit of maintaining the registration state for the UE 1. However, the draw back is that the MSC Server then needs to be able to sort out the UE 1 of interest from all registration states for the user (as the user may have several UE's registered at the same time).

SCC AS. Using the SCC AS has the benefit that it then might be possible to perform this subscription together with other subscriptions to the SCC AS from the MSC server 4 (such as possible subscription to STN-SR change). This would then lower the overall number of subscriptions for the MSC Server 4.

FIG. 3 illustrates the MSC Server 4 sending S5 a subscription to a receiving node 6, which could be one of the three nodes described above, in step S5. The receiving node 6 sends a notification message to the MSC Server 4 in step S6, in the event that the UE 1 changes its registration status (e.g. the UE 1 becomes de-registered, or is registered again after being de-registered for a while).

Figure 4:
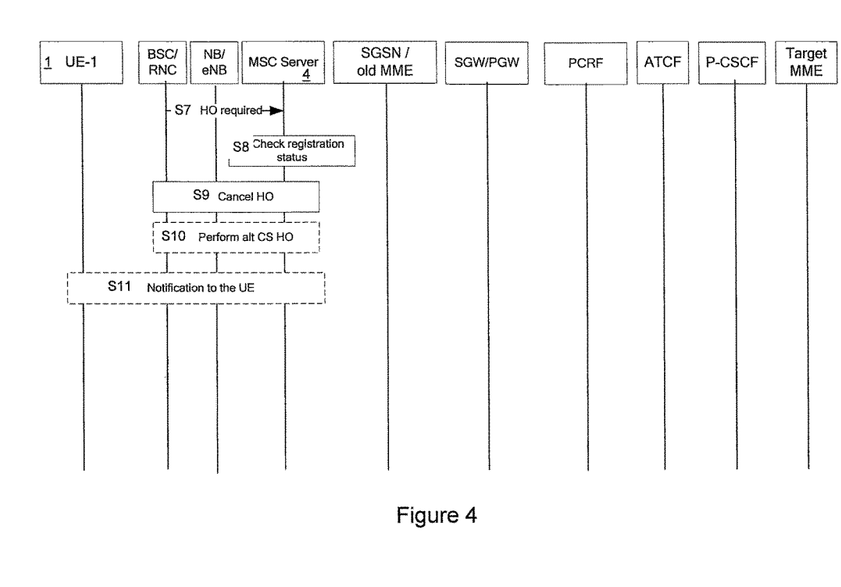
FIG. 4 is a signalling diagram illustrating procedures for handover according to embodiments of the invention.

When handover is required, the signalling shown in FIG. 4 occurs:

S7. The MSC Server 4 receives a handover required message from the access network 2, including an indication that rSRVCC is requested.

S8. The MSC Server 4 checks the registration status of the UE 1 to determine whether or not it is possible to perform rSRVCC. The checks may include a check that the registration from the MSC Server 4 has been done through the ATCF and that it is possible to perform rSRVCC over the registration. This may be performed, for example, by determining that the MSC Server 4 does not have the same address as the ATCF. A check may be performed to ascertain UE's 1 IMS registration status and if it has received any notification that the UE 1 is not registered anymore. If either check results in a case in which rSRVCC is not possible, steps S9 to S11 are performed. Otherwise, regular rSRVCC procedures are executed.

S9. The MSC Server 4 invokes the error procedures for rSRVCC. If the MSC Server 4 determines that handover is not possible at all, it sends a handover cancellation message to the radio network, optionally including the reason for the cancellation.

S10. On the other hand, if the MSC Server 4 detects that it may still be possible perform a handover from the current CS access to another CS access (e.g., from GERAN to UTRAN-CS), the MSC server 4 invokes such procedures instead of rSRVCC. As an example, consider the case where the UE 1 is using the CS access of a GERAN network, and rSRVCC is triggered as a UTRAN access with HSPA is available. The MSC Server 4 detects that rSRVCC cannot be performed to UTRAN HSPA because the UE 1 is no longer registered. The MSC Server 4 instead decides to perform the handover to the Circuit Switched network of UTRAN. In other words, the handover is performed from one CS access network to another, different CS access network rather than to a PS access network.

S11. In the event that handover fails, the UE 1 is optionally notified of the failed handover and that the IMS registration has been de-registered in the network. The UE 1 may also be notified directly about the IMS registration being de-registered if the MSC has received this notification.

Figure 5:
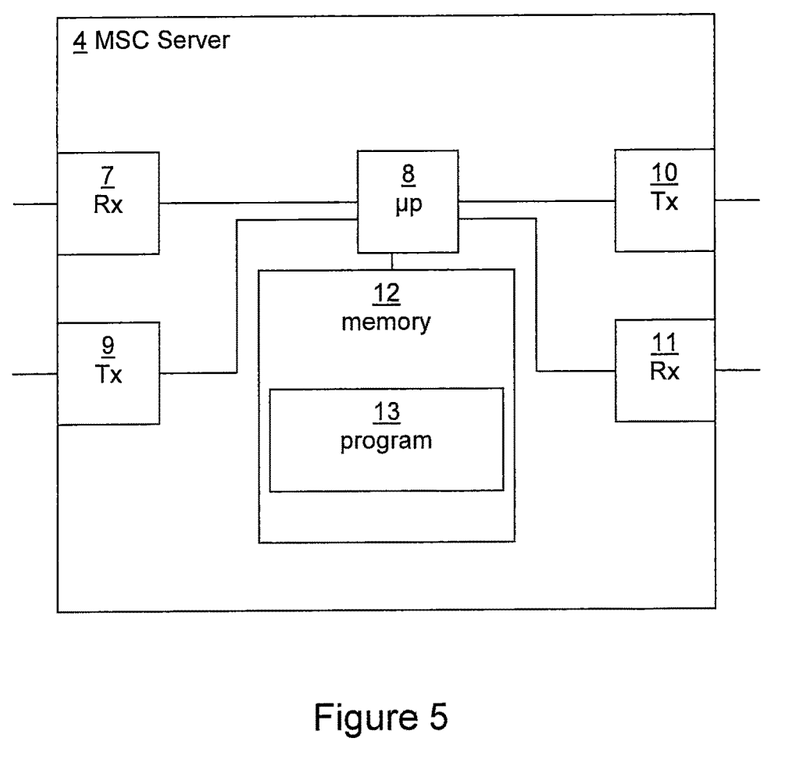
FIG. 5 illustrates schematically in a block diagram a MSC Server according to an embodiment of the invention.

Referring to FIG. 5 herein, there is illustrated an MSC Server 4. The MSC Server 4 is provided with a first receiver 7 for receiving a notification that a call for the UE 1 requires handover from the circuit switched access network 2 to the packet switched access network 3. A processor 8 is provided for determining whether the terminal 1 is currently registered in the IMS network 5 and/or whether the MSC Server 4 is registered such that it can perform handover from the circuit switched access network 2 to the packet switched access network 3. The processor 8 is further arranged to, in the event that the UE 1 is not currently registered in the IMS network 5 and/or the MSC Server 4 is not registered so as to be able to perform handover from the circuit switched access network 2 to the packet switched access network 3, invoke an error handling procedure in the MSC Server 4. In the event that the terminal 1 is currently registered in the IMS network 5 and MSC Server 4 is registered so as to be able to perform handover from the circuit switched access network to the packet switched access network, the processor 8 is arranged to invoke rSRVCC to perform a handover of the call from the circuit switched access network 2 to the packet switched access network 3.

Where the error handling procedure involves cancelling the handover, the MSC Server 4 is provided with a transmitter 9 for sending a notification message to the UE 1. The notification message includes any of a notification that handover has failed and a notification that the UE 1 is not registered in the IMS network 5.

Where the MSC Server 4 obtains information about the registration of the UE 1 using a subscription method, a second transmitter 10 is provided for sending the subscription message to the further node 6. A second receiver 11 is also provided for receiving from the further node 6 a notification, the notification informing the MSC Server 4 of any changes in registration status of the UE 1. However, it is possible for the MSC Server 4 to obtain information about the registration of the UE 1 'on the fly'.

The invention allows the MSC Server 4 to subscribe to the registration status of the UE 1 in the IMS network 5 (or obtain information about the registration status of the UE 1 in the IMS network 5 in some other way). The MSC Server 4 checks the registration status for both UE 1 and MSC Server 4 when receiving a handover command for handing over a call from a circuit switched network 2 to a packet switched network 3. If either the UE 1 or the MSC Server 4 is not capable of performing rSRVCC, the handover is cancelled, or alternative handover procedures are invoked. The invention allows the MSC Server 4 to handle the case where a UE's 1 registration in the IMS network 5 expires during an ongoing CS call, prior to rSRVCC. This leads to reduced signalling and prevents the target packet switched network 3 from setting up resources to handle the handover unnecessarily.

Figure 6:
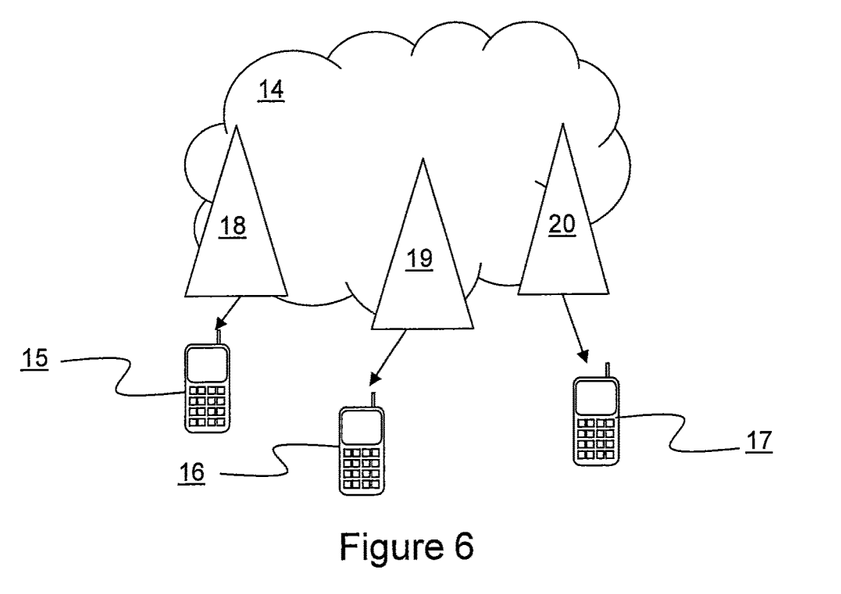
FIG. 6 illustrates an example communication system.

Although the described solutions may be implemented in any appropriate type of telecommunication system supporting any suitable communication standards and using any suitable components, particular embodiment of the described solutions may be implemented in a Long Term Evolution (LTE) network, as illustrated in FIG. 6.

As shown in FIG. 6, the example network 14 may include one or more UEs 15, 16, 17 and one or more base stations 18, 19, 20 capable of communicating with these UEs, along with any additional elements suitable to support communication between UEs or between a UE and another communication device (such as a landline telephone). Although the illustrated UEs 15, 16, 17 may represent communication devices that include any suitable combination of hardware and/or software, these UEs may, in particular embodiments, represent devices such as the example UE 15 illustrated in greater detail in FIG. 7. Similarly, although the illustrated base stations may represent network nodes that include any suitable combination of hardware and/or software, these base stations may, in particular embodiments, represent devices such as the example base station 18 illustrated in FIG. 8.

Figure 7:
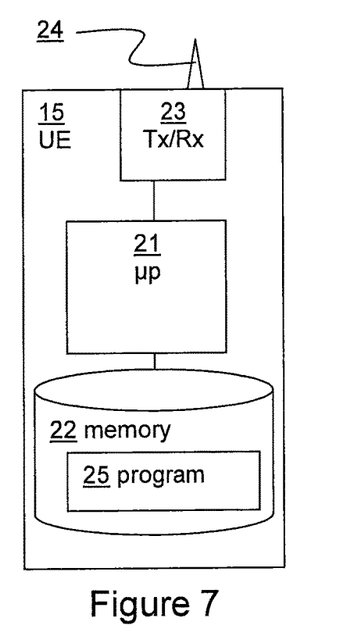
FIG. 7 illustrates an example User Equipment.

As shown in FIG. 7, the example UE 15 includes a processor 21, a memory 22, a transceiver 23 and an antenna 24. In particular embodiments, some Or all of the functionality described above as being provided by mobile communication devices or other forms of UE may be provided by the UE processor 21 executing instructions stored as a program 25 on a computer-readable medium, such as the memory 22 shown in FIG. 7. Alternative embodiments of the UE 15 may include additional components beyond those shown in FIG. 7 that may be responsible for providing certain aspects of the UE's 15 functionality, including any of the functionality described above and/or any functionality necessary to support the solution described above.

Figure 8:
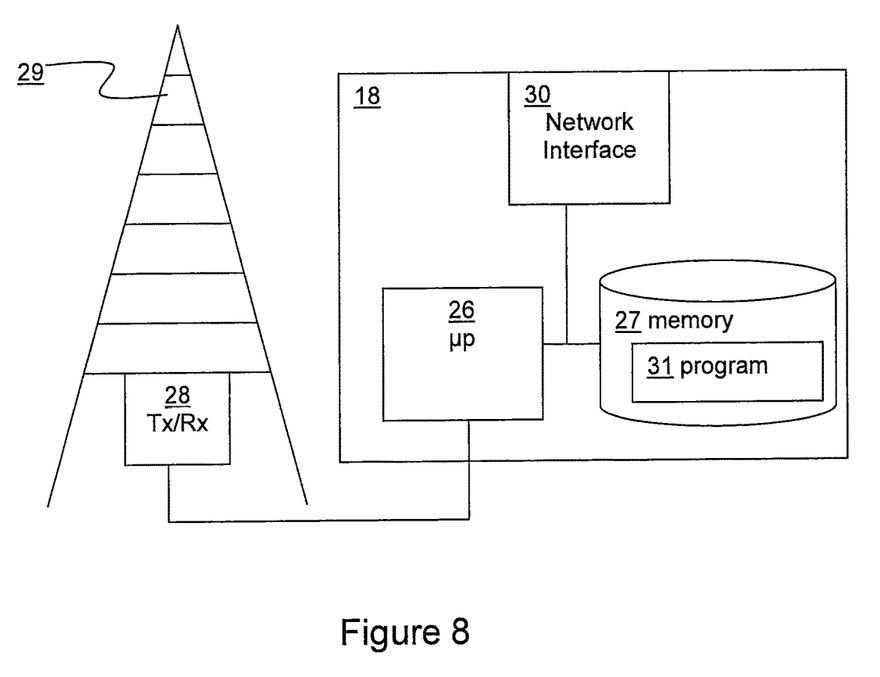
FIG. 8 illustrates an example bas station.

As shown in FIG. 8, the example base station 18 includes a processor 26, a memory 27, a transceiver 28, an antenna 29 and a network interface 30. In particular embodiments, some or all of the functionality described above as being provided by a mobile base station, a base station controller, a node B, an enhanced node B (eNodeB B), and/or any other type of mobile communications node may be provided by the base station processor executing instructions in the form of a program 31 stored on a computer-readable medium, such as the memory 27 shown in FIG. 8. Alternative embodiments of the base station may include additional components responsible for providing additional functionality, including any of the functionality identified above and/or any functionality necessary to support the solution described above.

It will be appreciated by the person of skill in the art that various modifications may be made to the above-described embodiments without departing from the scope of the present invention. For example, while the invention is envisaged to work in an LTE network, it may apply to the case where a call is to be transferred from a circuit switched network to any type of packet switched network.

The following abbreviations have been used in this specification:
3GPP 3rd Generation Partnership Project
ATCF Access Transfer Control Function
CS circuit switched
E-UTRAN Evolved Universal Terrestrial Radio Access Network
GERAN GSM EDGE Radio Access Network
IMS IP Multimedia Subsystem
LTE Long Term Evolution
MSC Mobile Switching Centre
PS packet switched
rSRVCC return Single Radio Voice Call Continuity
S-CSCF Serving-Call Session Control Function
SCC AS Service Centralization and Continuity Application Server
SGW Serving Gateway
SIP Session Initiation Protocol
SRVCC Single Radio Voice Call Continuity
UE User Equipment
UTRAN UMTS Terrestrial Radio Access Network

The invention claimed is:

1. A method of handling a call transfer from a circuit switched access network to a packet switched access network, the method comprising:
at a Mobile Switching Centre, MSC, Server, receiving a notification that a call for a terminal requires handover from a circuit switched access network to a packet switched access network;
at the MSC Server, determining that an IP Multimedia Subsystem network registration of the terminal over the packet switched access network has expired by determining whether the terminal is currently registered in an IP Multimedia Subsystem, IMS, network and/or whether registration from the MSC Server was not done in a way to allow handover from the circuit switched access network to the packet switched access network;
when it is determined that the terminal is not currently registered in the IMS network and/or registration from the MSC Server was not done in a way to allow handover from the circuit switched access network to the packet switched access network, invoking an error handling procedure in the MSC Server, wherein the error handling procedure comprises invoking handover from the circuit switched network to a different circuit switched network; and
when it is determined that the terminal is currently registered in the IMS network and the MSC Server is registered so as to be able to perform handover from the circuit switched access network to the packet switched access network, invoking return Single Radio Voice Call Continuity procedure to perform a handover of the call from the circuit switched access network to the packet switched access network.

2. The method according to claim 1, wherein the error handling procedure comprises invoking handover from the circuit switched network to a different circuit switched network using procedures other than those of a return Single Radio Voice Call Continuity procedure.

3. A method of handling a call transfer from a circuit switched access network to a packet switched access network, the method comprising:
at a Mobile Switching Centre, MSC, Server, receiving a notification that a call for a terminal requires handover from a circuit switched access network to a packet switched access network;
at the MSC Server, determining that an IP Multimedia Subsystem network registration of the terminal over the packet switched access network has expired by determining whether the terminal is currently registered in an IP Multimedia Subsystem, IMS, network and/or whether registration from the MSC Server was not done in a way to allow handover from the circuit switched access network to the packet switched access network;
when it is determined that the terminal is not currently registered in the IMS network and/or registration from the MSC Server was not done in a way to allow handover from the circuit switched access network to the packet switched access network, invoking an error handling procedure in the MSC Server;

when it is determined that the terminal is currently registered in the IMS network and the MSC Server is registered so as to be able to perform handover from the circuit switched access network to the packet switched access network, invoking return Single Radio Voice Call Continuity procedure to perform a handover of the call from the circuit switched access network to the packet switched access network;

prior to receiving the notification that the call for the terminal requires handover, sending a subscription request message from the MSC Server to a further node, the subscription request message requesting a notification of a change in a registration status of the terminal; and at the MSC Server, receiving from the further node a notification informing the MSC Server of a change in registration status of the terminal.

4. The method according to claim 3, wherein the further node is selected from at least one of an Access Transfer Control Function, a Serving-Call Session Control Function, and a Service Centralization and Continuity Application Server.

5. A method of handling a call transfer from a circuit switched access network to a packet switched access network, the method comprising:

at a Mobile Switching Centre, MSC, Server, receiving a notification that a call for a terminal requires handover from a circuit switched access network to a packet switched access network;

at the MSC Server, determining that an IP Multimedia Subsystem network registration of the terminal over the packet switched access network has expired by determining whether the terminal is currently registered in an IP Multimedia Subsystem, IMS, network and/or whether registration from the MSC Server was not done in a way to allow handover from the circuit switched access network to the packet switched access network;

when it is determined that the terminal is not currently registered in the IMS network and/or registration from the MSC Server was not done in a way to allow handover from the circuit switched access network to the packet switched access network, invoking an error handling procedure in the MSC Server; and when it is determined that the terminal is currently registered in the IMS network and the MSC Server is registered so as to be able to perform handover from the circuit switched access network to the packet switched access network, invoking return Single Radio Voice Call Continuity procedure to perform a handover of the call from the circuit switched access network to the packet switched access network, wherein the MSC Server determines that it is not registered so as to be able to perform handover from the circuit switched access network to the packet switched access network by determining that it does not have an address of an Access Transfer Control Function.

6. A Mobile Switching Centre, MSC, Server comprising:
a first receiver configured for receiving a notification that a call for a terminal requires handover from a circuit switched access network to a packet switched access network;
a hardware processor; and
a memory storing program code that is executed by the hardware processor to perform operations comprising:
determining that an IP Multimedia Subsystem network registration of the terminal over the packet switched access network has expired by determining whether the terminal is currently registered in an IMS network and/or whether registration from the MSC Server was not done is a way to allow handover from the circuit switched access network to the packet switched access network;

when it is determined that the terminal is not currently registered in the IMS network and/or registration from the MSC Server was not done in a way to allow handover from the circuit switched access network to the packet switched access network, invoke an error handling procedure in the MSC Server, wherein the error handling procedure comprises invoking handover from the circuit switched network to a different circuit switched network; and when it is determined that the terminal is currently registered in the IMS network and the MSC Server is registered so as to be able to perform handover from the circuit switched access network to the packet switched access network, invoke return Single Radio Voice Call Continuity to perform a handover of the call from the circuit switched access network to the packet switched access network.

7. The MSC Server according to claim 6, wherein the error handling procedure performed by the processor comprises invoking handover from the circuit switched network to a different circuit switched network using procedures other than those of a return Single Radio Voice Call Continuity procedure.

8. The MSC Server according to claim 6, further comprising:
a second transmitter, wherein the processor is configured for sending a subscription request message to a further node through the second transmitter, the subscription request message requesting a notification of a change in a registration status of the terminal; and
a second receiver, wherein the processor is configured for receiving from the further node through the second receiver a notification informing the MSC Server of a change in registration status of the terminal.

9. A Mobile Switching Centre, MSC, Server comprising:
a first receiver configured for receiving a notification that a call for a terminal requires handover from a circuit switched access network to a packet switched access network;
a hardware processor; and
a memory storing program code that is executed by the hardware processor to perform operations comprising:
determining that an IP Multimedia Subsystem network registration of the terminal over the packet switched access network has expired by determining whether the terminal is currently registered in an IMS network and/or whether registration from the MSC Server was not done is a way to allow handover from the circuit switched access network to the packet switched access network;

when it is determined that the terminal is not currently registered in the IMS network and/or registration from the MSC Server was not done in a way to allow handover from the circuit switched access network to the packet switched access network, invoke an error handling procedure in the MSC Server;

when it is determined that the terminal is currently registered in the IMS network and the MSC Server is registered so as to be able to perform handover from the circuit switched access network to the packet switched access network, invoke return Single Radio Voice Call Continuity to perform a handover of the call from the circuit switched access network to the packet switched access network; and determine that the MSC Server is not registered so as to be able to perform handover from the circuit switched access network to the packet switched access network by determining that it does not have the address of an Access Transfer Control Function.

10. A terminal for use in a mobile communication network, the terminal comprising:
a receiver;
a hardware processor connected to the receiver; and
a memory storing program code that is executed by the hardware processor to perform operations comprising:
in the event that during an attempted handover from a circuit switched access network to a packet switched access network, the terminal is not currently registered in an IMS network and/or an MSC Server serving the terminal is not registered so as to be able to perform handover from a circuit switched access network to a packet switched access network, responding to control from the MSC Server by performing handover from the circuit switched network to a different circuit switched network using procedures other than those of a return Single Radio Voice Call Continuity procedure.

11. A Mobile Switching Centre, MSC, Server comprising:
a first receiver configured for receiving a notification that a call for a terminal requires handover from a circuit switched access network to a packet switched access network;
a hardware processor; and
a memory storing program code that is executed by the hardware processor to perform operations comprising:
determining that an IP Multimedia Subsystem network registration of the terminal over the packet switched access network has expired by determining whether the terminal is currently registered in an IMS network and/or whether registration from the MSC Server was not done is a way to allow handover from the circuit switched access network to the packet switched access network;
when it is determined that the terminal is not currently registered in the IMS network and/or registration from the MSC Server was not done in a way to allow handover from the circuit switched access network to the packet switched access network, invoke an error handling procedure in the MSC Server;
when it is determined that the terminal is currently registered in the IMS network and the MSC Server is registered so as to be able to perform handover from the circuit switched access network to the packet switched access network, invoke return Single Radio Voice Call Continuity to perform a handover of the call from the circuit switched access network to the packet switched access network;
prior to receiving the notification that the call for the terminal requires handover, sending a subscription request message from the MSC Server to a further node, the subscription request message requesting a notification of a change in a registration status of the terminal; and
receiving from the further node a notification informing the MSC Server of a change in registration status of the terminal.

* * * * *

UNITED STATES PATENT AND TRADEMARK OFFICE
CERTIFICATE OF CORRECTION

PATENT NO. : 9,900,806 B2
APPLICATION NO. : 14/919390
DATED : February 20, 2018
INVENTOR(S) : Lindholm et al.

It is certified that error appears in the above-identified patent and that said Letters Patent is hereby corrected as shown below:

On the Title Page

On Page 2, in Item (56), under "OTHER PUBLICATIONS", in Column 1, Lines 6-7, delete "S2-113474_1WAS_S2-113026_RSRVCC_IMS_REG_EXPIRATION," and insert -- S2-113474_WAS_S2-113026_RSRVCC_IMS_REG_EXPIRATION, --, therefor.

In the Specification

In Column 1, Line 8, delete "2014," and insert -- 2014, now Pat. No. 9,173,145, --, therefor.

In Column 1, Line 10, delete "8,660,091" and insert -- 8,660,091, --, therefor.

In Column 1, Line 60, delete "S1:" and insert -- S1. --, therefor.

In Column 3, Line 60, delete "that that" and insert -- that --, therefor.

In Column 4, Line 31, delete "bas" and insert -- base --, therefor.

In Column 4, Line 42, delete "PS access network 2" and insert -- PS access network 3 --, therefor.

In Column 5, Line 18, delete "UE's" and insert -- UEs --, therefor.

In Column 7, Line 19, delete "Or all of" and insert -- or all of --, therefor.

In the Claims

In Column 10, Line 4, in Claim 6, delete "is a" and insert -- in a --, therefor.

Signed and Sealed this
Fifteenth Day of May, 2018

Andrei Iancu
*Director of the United States Patent and Trademark Office*

In Column 10, Line 54, in Claim 9, delete "is a" and insert -- in a --, therefor.

In Column 12, Line 6, in Claim 11, delete "is a" and insert -- in a --, therefor.